US012384150B2

(12) United States Patent
Nakagawa et al.

(10) Patent No.: US 12,384,150 B2
(45) Date of Patent: Aug. 12, 2025

(54) LIQUID EJECTION HEAD AND LIQUID EJECTION APPARATUS

(71) Applicant: CANON KABUSHIKI KAISHA, Tokyo (JP)

(72) Inventors: Yoshiyuki Nakagawa, Kanagawa (JP); Takuro Yamazaki, Tokyo (JP); Akiko Hammura, Tokyo (JP); Atsushi Teranishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 18/126,687

(22) Filed: Mar. 27, 2023

(65) Prior Publication Data

US 2023/0311501 A1 Oct. 5, 2023

(30) Foreign Application Priority Data

Mar. 30, 2022 (JP) ................................ 2022-056385

(51) Int. Cl.
*B41J 2/14* (2006.01)

(52) U.S. Cl.
CPC .. *B41J 2/14201* (2013.01); *B41J 2002/14419* (2013.01)

(58) Field of Classification Search
CPC .......... B41J 2/14201; B41J 2002/14419; B41J 2/055; B41J 2/14233; B41J 2002/14459; B41J 2202/11; B41J 2202/12; B41J 2202/20; B41J 2/045; B41J 2/21
See application file for complete search history.

(56) References Cited

U.S. PATENT DOCUMENTS

2014/0192118 A1 7/2014 Cruz-Uribe et al.
2017/0368820 A1* 12/2017 Kobayashi .......... B41J 2/14209
2020/0290348 A1 9/2020 Kato

FOREIGN PATENT DOCUMENTS

JP 2019-155909 A 9/2019

OTHER PUBLICATIONS

Extended European Search Report dated Aug. 3, 2023, in European Application No. 23163622.6.
U.S. Appl. No. 18/126,664, Akiko Hammura Yoshiyuki Nakagawa Takuro Yamazaki Atsushi Teranishi, filed Mar. 27, 2023.
U.S. Appl. No. 18/126,674, Akiko Hammura Yoshiyuki Nakagawa Takuro Yamazaki Atsushi Teranishi, filed Mar. 27, 2023.
U.S. Appl. No. 18/125,220, Takuro Yamazako Yoshiyuki Nakagawa Akiko Hammura Atsushi Teranishi, filed Mar. 23, 2023.

* cited by examiner

*Primary Examiner* — Lisa Solomon
(74) *Attorney, Agent, or Firm* — Venable LLP

(57) ABSTRACT

A liquid ejection head and liquid ejection apparatus are capable of reducing or preventing a decrease in image quality without increasing the chip size. To achieve this, a configuration is employed in which a bonding layer is not provided between a liquid supply substrate and channel partitions between common supply channels and common collection channels, and a minute communication portion is provided there.

12 Claims, 10 Drawing Sheets

LIQUID EJECTION HEAD AND LIQUID EJECTION APPARATUS

BACKGROUND OF THE INVENTION

Field of the Invention

The present invention relates to a liquid ejection head for ejecting a circulated liquid, and a liquid ejection apparatus on which a liquid ejection head is mountable.

Description of the Related Art

A problem with liquid ejection heads that eject liquids is so-called crosstalk in which a pressure fluctuation occurring in response to ejection of a droplet from an ejection port through a pressure chamber propagates to other pressure chambers through a liquid channel and changes ejection characteristics.

Also, in recent years, there have been demands for liquid ejection heads to eject liquids in pressure chambers while circulating these liquids, in addition to demands to achieve higher image quality and resolution.

Japanese Patent Laid-Open No. 2019-155909 discloses a configuration in which common supply channels and common collection channels are alternately disposed, and dampers are provided on part of walls forming the common supply channels and the common collection channels to suppress crosstalk. In the configuration of Japanese Patent Laid-Open No. 2019-155909, a damper member, which serves as the dampers, is joined to upper portions of channel partitions between the common supply channels and the common collection channels.

Configurations such as the one in Japanese Patent Laid-Open No. 2019-155909 need sufficient joining areas on the upper portions of the channel partitions. In this case, however, the damper areas and the fluid areas may be small. The decrease in the size of the damper areas may increase the crosstalk, and the decrease in the size of the fluid areas may increase the pressure drop. This may consequently decrease the image quality. On the other hand, in a case where the joining areas are made small, the bonding layer may stick out of the joining portions, which leads to a concern about closure of the channels or the like. This may consequently decrease the image quality. Moreover, it is not preferable to increase the chip size in order to provide sufficient damper areas, fluid areas, and joining areas.

SUMMARY OF THE INVENTION

In view of the above, the present invention provides a liquid ejection head and liquid ejection apparatus capable of reducing or preventing a decrease in image quality without increasing the chip size.

A liquid ejection head of the present invention includes: an ejection port from which to eject a liquid; a pressure chamber communicating with the ejection port; a pressure generating element provided in the pressure chamber and being capable of ejecting the liquid from the ejection port by applying a pressure; an individual supply channel communicating with the pressure chamber and being capable of supplying the liquid to the pressure chamber; an individual collection channel communicating with the pressure chamber and being capable of collecting the liquid from the pressure chamber; a common supply channel communicating with the individual supply channel; a common collection channel communicating with the individual collection channel; and a channel partition provided between the common supply channel and the common collection channel, in which a plurality of the ejection ports and a plurality of the pressure chambers are provided, the common supply channel and the common collection channel communicate with a plurality of the individual supply channels and a plurality of the individual collection channels, respectively, and a communication portion communicating with the common supply channel and the common collection channel is provided at an area which is present between a first substrate where the channel partition is formed and a second substrate laminated on the first substrate, and corresponds to the channel partition.

According to the present invention, it is possible to provide a liquid ejection head and liquid ejection apparatus capable of reducing or preventing a decrease in image quality without increasing the chip size.

Further features of the present invention will become apparent from the following description of exemplary embodiments with reference to the attached drawings.

DESCRIPTION OF THE EMBODIMENTS

First Embodiment

A liquid ejection head and liquid ejection apparatus according to the present embodiment are applicable to apparatuses such as printers, copiers, facsimile machines having a communication system, and word processors having a printer unit, as well as industrial printing apparatuses combining various processing apparatuses.

A first embodiment of the present invention will be described below with reference to drawings.

Figure 1:
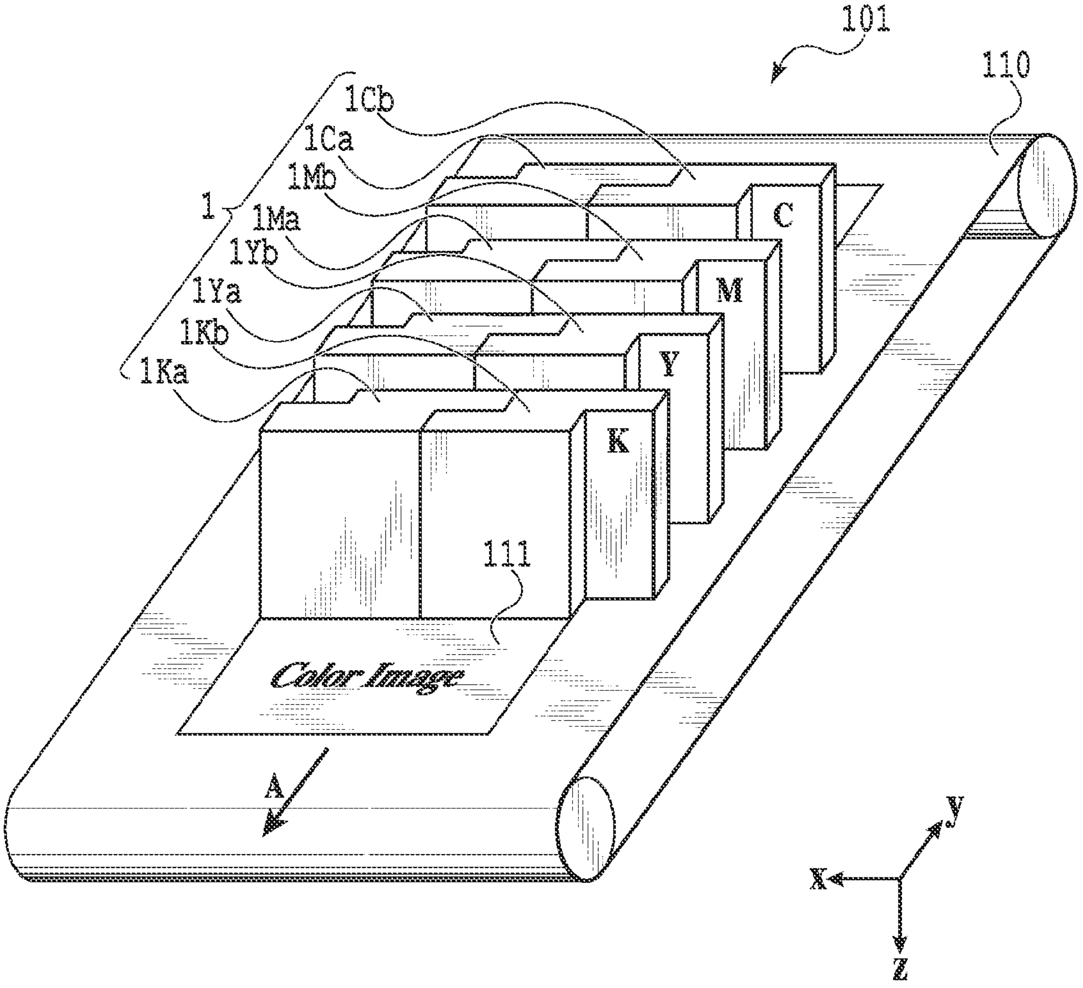
FIG. 1 is a schematic perspective view illustrating a liquid ejection apparatus on which liquid ejection heads are mountable.

FIG. 1 is a schematic perspective view illustrating a liquid ejection apparatus 101 on which liquid ejection heads 1 are mountable, the liquid ejection heads 1 being liquid ejection heads to which the present embodiment is applicable. The liquid ejection apparatus 101 forms an image on a print medium 111 by ejecting liquids (hereinafter also referred to as "inks") from the liquid ejection heads 1 while moving the print medium 111 to a position opposed to the liquid ejection surfaces of the liquid ejection heads 1. The liquid ejection heads 1 mounted on the liquid ejection apparatus 101 include liquid ejection heads 1Ca and 1Cb for a cyan (C) ink and liquid ejection heads 1Ma and 1Mb for a magenta (M) ink. The liquid ejection heads 1 further include liquid ejection heads 1Ya and 1Yb for a yellow ink and liquid ejection heads 1Ka and 1Kb for a black (K) ink.

A plurality of ejection ports are provided in the liquid ejection heads 1 along an X direction along the width of the print medium 111. The print medium 111 is conveyed in an A direction by a conveyance unit 110, and printing is performed thereon by the liquid ejection heads 1.

Figure 2:
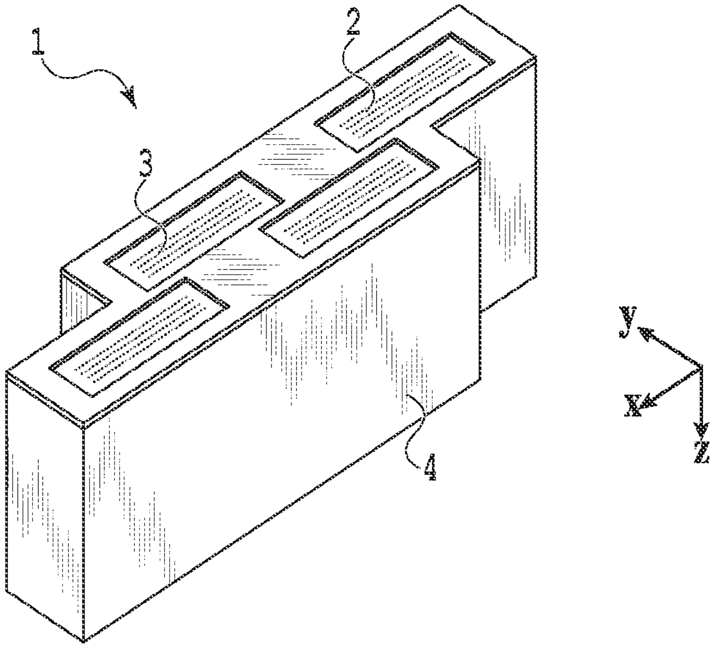
FIG. 2 is an external perspective view illustrating a liquid ejection head.
Figure 3A:
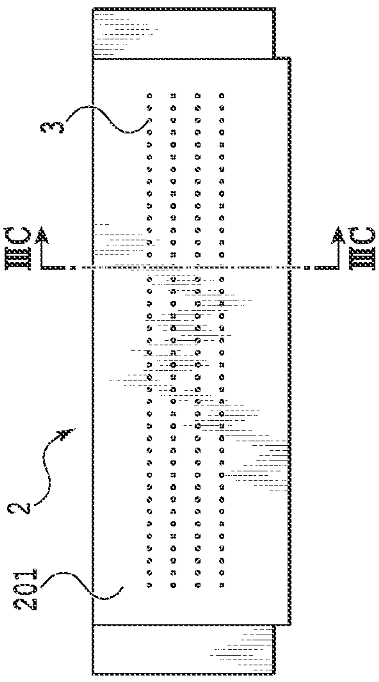
FIG. 3A is a view illustrating a liquid ejection substrate.
Figure 3B:
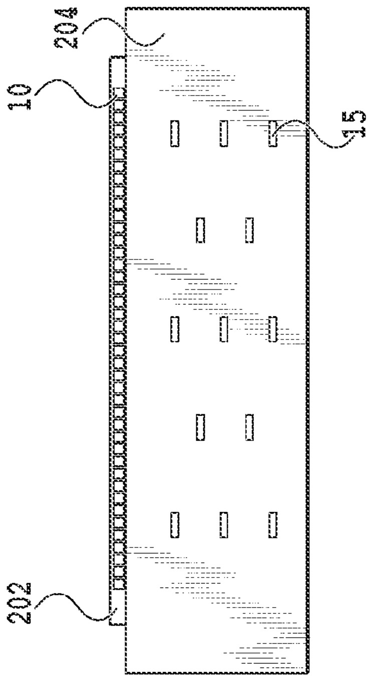
FIG. 3B is a view illustrating the liquid ejection substrate.

FIG. 2 is an external perspective view illustrating a liquid ejection head 1. Each liquid ejection head 1 in the present embodiment has four liquid ejection substrates 2 disposed in a head main body 4. The liquid ejection substrates 2 are disposed such that end portions of arrays of ejection ports 3 extending in the X direction overlap one another in a Y direction. Disposing the liquid ejection substrates 2 in this manner enables printing with long ejection port arrays. The ink to be ejected by the liquid ejection head 1 is supplied to the liquid ejection substrates 2 from a liquid tank (not illustrated) through a common supply port (not illustrated) in the head main body 4, FIG. 3A is a view illustrating a liquid ejection substrate 2 as seen from the ejection port surface side where ejection ports 3 are formed. FIG. 3B is a view illustrating the liquid ejection substrate 2 as seen from the side opposite to the ejection port surface. The plurality of ejection ports 3 formed in an ejection port substrate 201 are disposed along the longitudinal direction of the ejection port substrate 201, and form a plurality of ejection port arrays. A plurality of connection channels 15 are formed in a channel formation substrate 204. The ink is supplied from some of the connection channel 15 into the liquid ejection substrate 2, and is ejected from the ejection ports 3 through internal channels to be applied to the print medium 111.

In the head main body 4, there is disposed an electric substrate (not illustrated) for supplying electric power and signals necessary for ejecting the liquid. This electric substrate is connected to terminals 10 on each liquid ejection substrate 2 by wirings (not illustrated). The liquid ejection head 1 can be configured in any forms including the example of FIG. 2, and other forms are not limited.

Figure 3C:
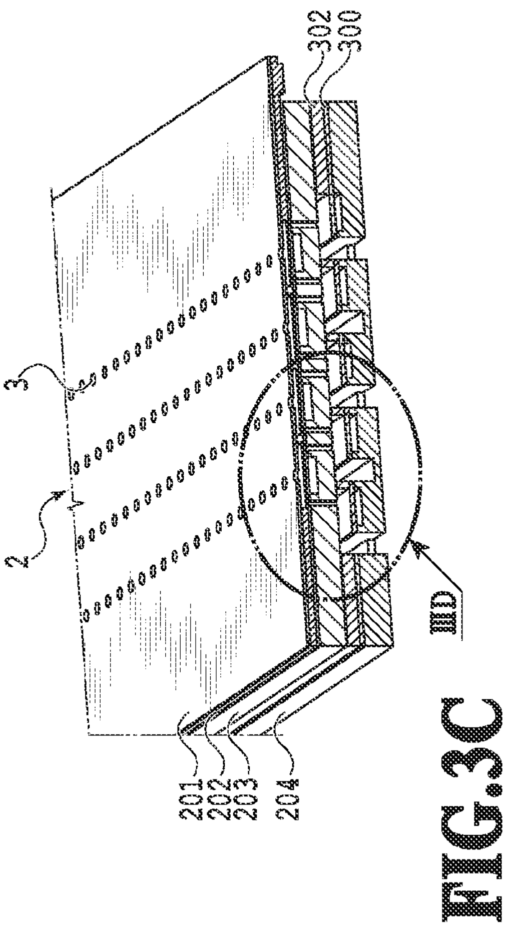
FIG. 3C is a view illustrating the liquid ejection substrate.

FIG. 3C is a cross-sectional view of the liquid ejection substrate 2 along the IIIC-IIIC line in FIG. 3A. The liquid ejection substrate 2 includes the ejection port substrate 201, an actuator substrate 202, a liquid supply substrate 203, and the channel formation substrate 204. The liquid ejection substrate 2 further includes a damper substrate 302 including a damper member 300 between the channel formation substrate 204 and the liquid supply substrate 203. Thus, the liquid ejection substrate 2 includes five substrates.

Figure 3D:
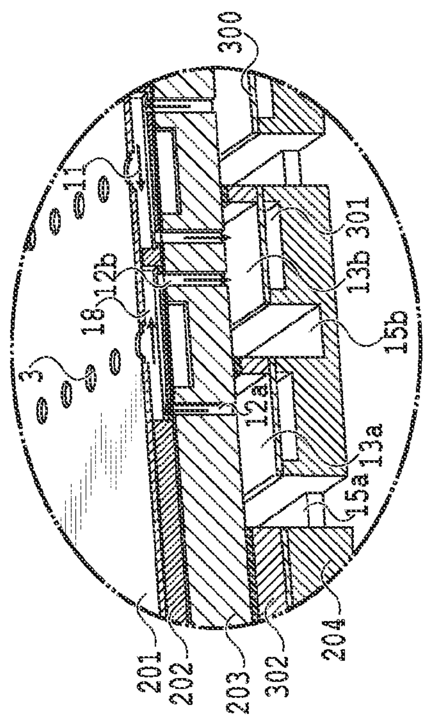
FIG. 3D is a view illustrating the liquid ejection substrate.

FIG. 3D is an enlarged view of the circled part IIID in FIG. 3C. A plurality of pressure chambers 11 are provided in the liquid ejection substrate 2. Each pressure chamber 11 is formed so as to communicate with an ejection port 3. In the actuator substrate 202, which forms some walls of the pressure chambers 11, piezoelectric elements 18 are provided so as to face the ejection ports 3. The liquid can be ejected from the ejection ports 3 by actuating the piezoelectric elements 18. By receiving a voltage, the piezoelectric elements 18 deform so as to pressurize the liquid inside the pressure chambers 11 and eject the liquid in the form of droplets from the ejection ports 3. Also, individual supply channels 12*a* and individual collection channels 12*b* are formed so as to communicate with the pressure chambers 11. Each individual supply channel 12*a* communicates with a common supply channel 13*a*. Each individual collection channel 12*b* communicates with a common collection channel 13*b*. The individual supply channels 12*a* are configured to be capable of supplying the liquid to the pressure chambers 11. The individual collection channels 12*b* are configured to be capable of collecting the liquid from the pressure chambers 11.

The walls of the common supply channels 13*a* facing the individual supply channels 12*a* are formed by the damper member 300. The walls of the common collection channels 13*b* facing the individual collection channels 12*b* are formed by the damper member 300. The surfaces of the damper member 300 opposite to its surfaces facing the individual collection channels 12*b* form some of damper areas 301. The common supply channels 13*a* are connected to connection channels 15*a*, and the liquid is supplied from the outside to the common supply channels 13*a* through the connection channels 15*a*, The common collection channels 13*b* are connected to connection channels 15*b*, and the liquid is collected from the common collection channels 13*b* to the outside through the connection channels 15*b*.

The ejection port substrate 201, the actuator substrate 202, the liquid supply substrate 203, and the channel formation substrate 204 can each be a silicon substrate or the like. They are not limited to separate substrates.

The damper member 300 is made of an elastic material. For example, resin materials such as polyimides and polyamides are usable. As for the damper substrate 302, the damper member 300 is affixed to one surface of a silicon substrate, and openings are formed in the damper member 300 according to the shapes of the channels in the channel formation substrate 204 by means such as etching. Then, the damper substrate 302 is affixed to the channel formation substrate 204, and the surface opposite to the damper member 300 is etched. In this way, the common supply channels 13*a* and the common collection channels 13*b* can be formed. The means for forming the openings in the damper member 300 can be dry etching, or patterning using light exposure in a case where the damper member 300 is a photosensitive resin.

In the present embodiment, a configuration in which the liquid is ejected from the ejection ports 3 by actuating the piezoelectric elements 18 has been exemplarily described. The configuration, however, is not limited to this one and may be such that the liquid is ejected from the ejection ports by actuating pressure generating elements, such as heating elements.

Figure 4A:
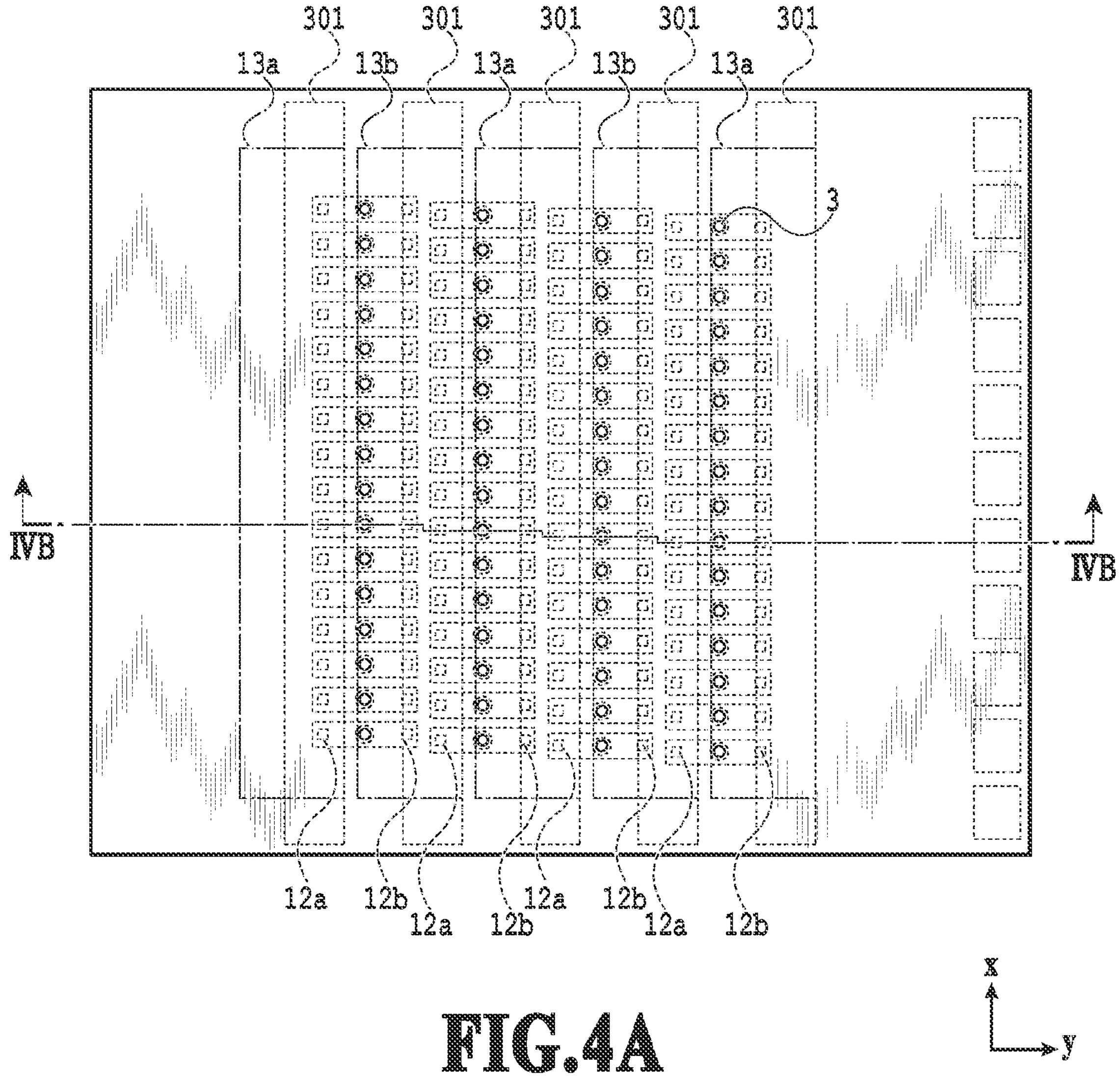
FIG. 4A is a view illustrating a liquid ejection substrate.
Figure 4B:
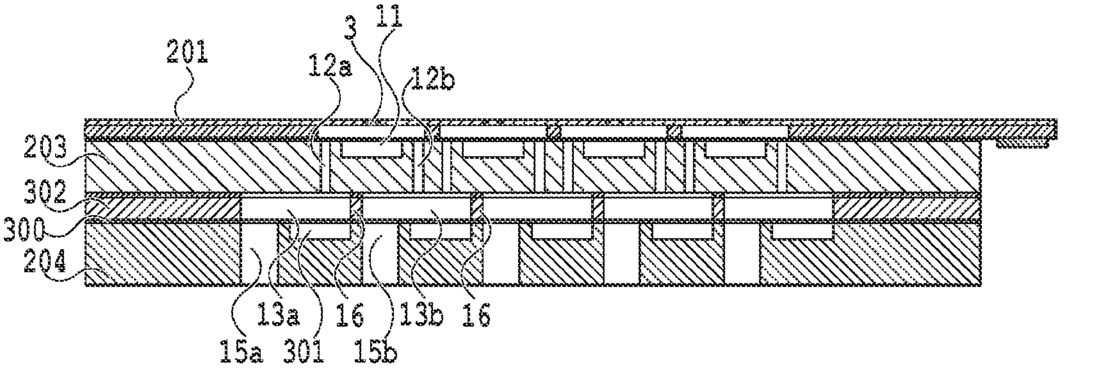
FIG. 4B is a view illustrating the liquid ejection substrate.

FIG. 4A is an enlarged transparent plan view illustrating a part of a liquid ejection substrate 2. FIG. 4B is a cross section along the IVB-IVB line in FIG. 4A. In the liquid ejection substrate 2, there are disposed a plurality of ejection ports 3, and pressure chambers 11 communicating with the ejection ports 3 and provided corresponding to the ejection ports 3. Also, in the liquid ejection substrate 2, a plurality of ejection port arrays each formed by arraying ejection ports 3 in the X direction are formed side by side in the Y direction, and an individual supply channel 12*a* and an individual collection channel 12*b* are formed for each pressure chamber 11. The common supply channels 13*a* and the common collection channels 13*b* are formed so as to extend in the X direction, which is the longitudinal direction of the substrate. Moreover, the damper areas 301 are disposed so as to overlap the positions of the individual supply channels 12*a* and the individual collection channels 12*b*. Furthermore, the individual supply channels 12*a* are connected to the supply connection channels 15*a* through the common supply channels 13*a*, and the individual collection channels 12*b* are connected to the collection connection channels 15*b* through the common collection channels 13*b*.

The pressure chambers 11 corresponding to the ejection ports are adjacent to one another in the X direction, which is the transverse direction of the pressure chambers 11. By being adjacent in this manner, the ejection ports communicating with the pressure chambers 11 form ejection port arrays. This enables an increase in density. For example, in the present embodiment, the length of each pressure chamber 11 in its transverse direction (X direction) is 110 μm, and the pressure chambers 11 and the ejection ports 3 are disposed at intervals of 150 dpi. The plurality of ejection port arrays are disposed so as to be offset from one another in the Y direction, Such an arrangement enables a high ejection port density of 600 dpi on a print medium. In the present embodiment, four ejection port arrays are disposed to achieve 600 dpi. Alternatively, the configuration may be such that eight ejection port arrays are disposed to achieve 1200 dpi.

As mentioned earlier, by receiving a voltage, the piezoelectric elements 18 deform so as to pressurize the liquid inside the pressure chambers 11 and eject the liquid in the form of droplets from the ejection ports 3. At this time, pressure fluctuations occur in the pressure chambers 11. Increasing the density of the ejection ports 3 not only brings the pressure chambers 11 closer to one another but also brings the common supply channels 13*a* and the common collection channels 13*b* closer to one another. This will lead to so-called crosstalk in which the pressure fluctuation occurring in response to ejection of a droplet from an ejection port propagates through the corresponding pressure chamber 11, common supply channel 13*a*, and common collection channel 13*b* to other pressure chambers. The pressure generated in the pressure chamber 11 at the time of ejection propagates from the pressure chamber 11 through the corresponding individual supply channel 12*a* and individual collection channel 12*b* to the corresponding common supply channel 13*a* and common collection channel 13*b*. The pressure then propagates through the common supply channel 13*a* and the common collection channel 13*b* to the other pressure chambers.

The damper substrate 302 forms part of the common supply channels 13*a* and the common collection channels 13*b*, and channel partitions 16 are provided between the common supply channels 13*a* and the common collection channels 13*b*. In the present embodiment, the channel partitions 16 are made thin. This shortens the distances between the common supply channels 13*a* and the common collection channels 13*b* without narrowing the common supply channels 13*a* and the common collection channels 13*b* in the Y direction. Also, the damper areas 301 are disposed so as to extend along the longitudinal direction of the liquid ejection substrate 2, which is the X direction. This increases the size of the damper areas 301 without increasing the size of the liquid ejection substrate 2.

The damper areas 301 are provided at positions opposed to the individual supply channels 12*a* and the individual collection channels 12*h*. The damper areas 301 are configured to enable the damper member 300 to receive pressures propagating through the individual supply channels 12*a* and the individual collection channels 12*b* and get deformed to absorb pressure fluctuations. In the channel formation substrate 204, the damper areas 301, which permit the deformation of the damper member 300, and the supply connection channels 15*a* or the collection connection channels 15*b* are formed alternately.

Figure 5:
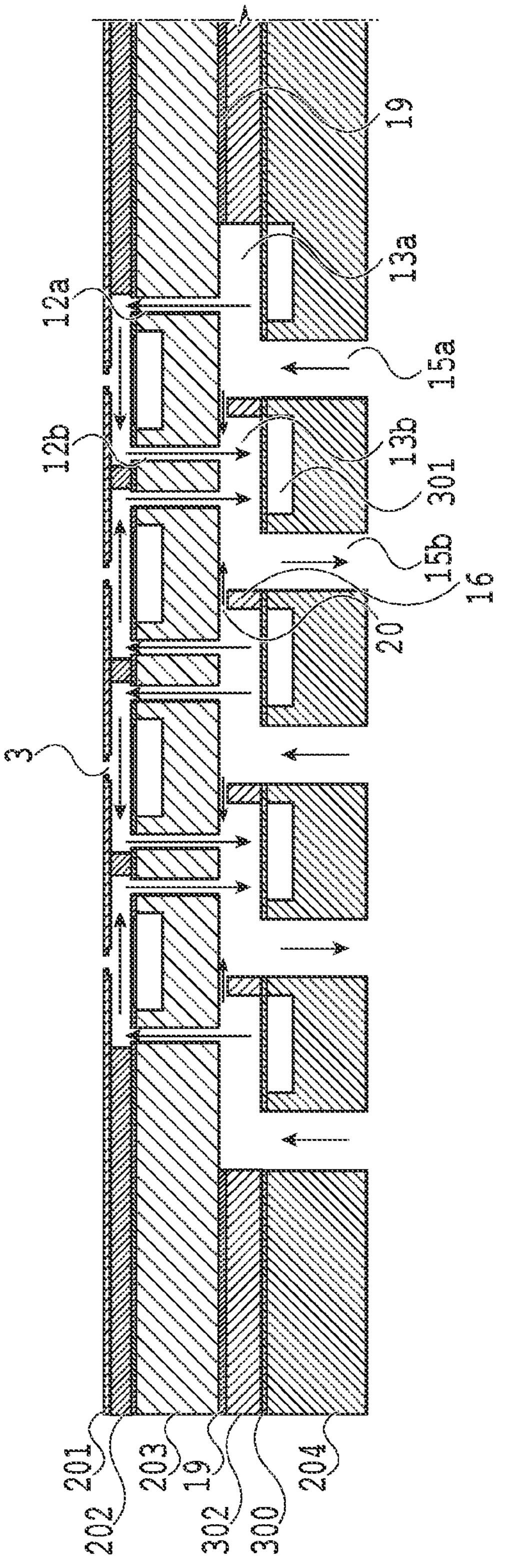
FIG. 5 is a view illustrating a liquid ejection substrate.
Figure 6:
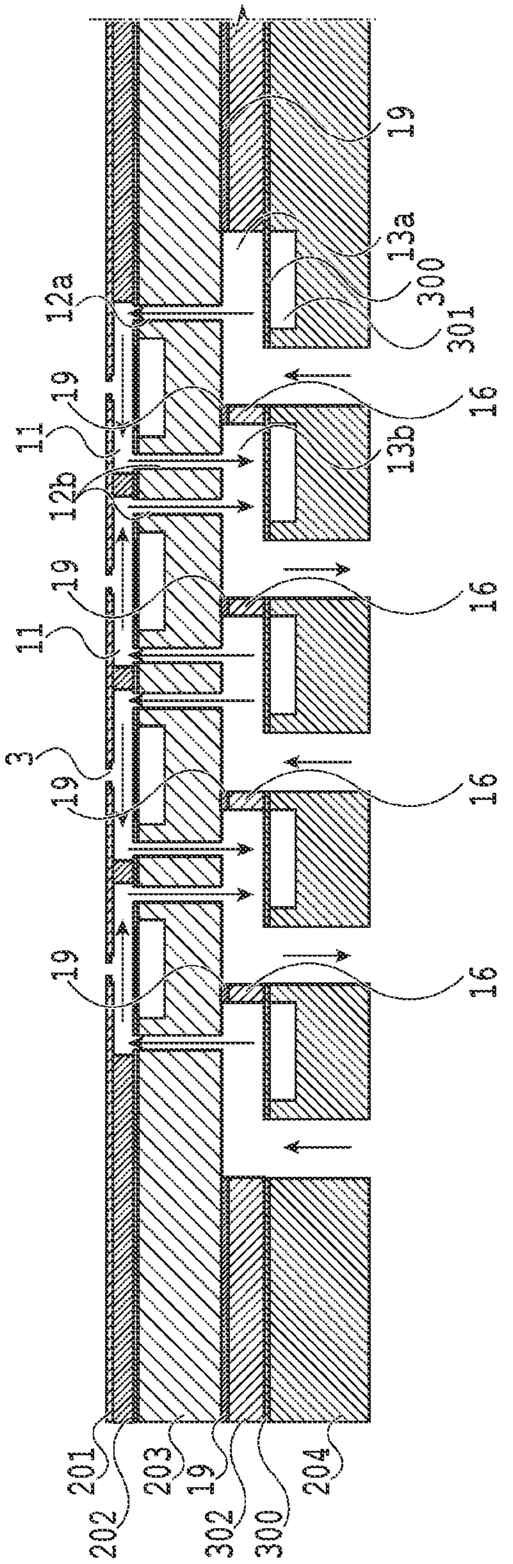
FIG. 6 is a cross-sectional view illustrating a liquid ejection substrate as a comparative example.

FIG. 5 is a cross-sectional view along the IVB-IVB line in FIG. 4A but illustrates a cross section as seen from the direction opposite to FIG. 4B. FIG. 6 is a cross-sectional view illustrating a liquid ejection substrate as a comparative example.

In each liquid ejection substrate 2 in the present embodiment, the common supply channels 13*a* and the common collection channels 13*b* are formed by affixing and laminating the liquid supply substrate 203 and the damper substrate 302, which includes the damper member 300, with a bonding layer 19. The bonding layer 19 is provided with a bonding area including an adhesive material and a non-bonding area including no adhesive material. When the liquid supply substrate 203 and the damper substrate 302 are affixed to each other, the area between the liquid supply substrate 203 and the channel partitions 16 between the common supply channels 13*a* and the common collection channels 13*b* is the non-bonding area, and the bonding layer 19 is not provided there. The bonding layer 19 is not provided between the liquid supply substrate 203 and the channel partitions 16, and a minute communication portion 20 is provided there. The portion of the damper substrate 302 where the common supply channels 13*a*, the common collection channels 13*b*, or the channel partitions 16 are not provided is the bonding area, and the bonding layer 19 is provided there.

In a case of affixing the substrates in a usual manner with a bonding layer, the configuration is such that the bonding layer 19 is provided also on the channel partitions 16, as illustrated in FIG. 6. Note that, in a case where the channel partitions are made thin as in the present embodiment, the channel partitions do not have enough area on which to provide the bonding layer. Consequently, the bonding layer may stick out into the common supply channels and the common collection channels. In the case where the bonding layer sticks out into the common supply channels and the common collection channels, there will be a possibility of closure of the common supply channels and the common collection channels or a decrease in the size of the channel areas, which may lead to an increased pressure loss.

By employing a configuration in which the bonding layer 19 is not provided on the channel partitions 16 between the common supply channels 13*a* and the common collection channels 13*b* as in the present embodiment, sufficient areas are provided for the common supply channels 13*a* and the common collection channels 13*b*, thereby reducing the pressure loss. Moreover, providing the minute communication portion 20 allows generation of flows in stagnating regions at upper portions of the common supply channels 13*a* and the common collection channels 13*b* (lower portions in the direction of gravity during use) and thus reduces stagnation. This facilitates the flow of bubbles and so on in the common supply channels 13*a* and the common collection channels 13*b* by circulatory flows.

Incidentally, in a case where the dimension of the minute communication portion 20 is large, the amount of the circulatory flows flowing through the individual supply channels 12*a*, the pressure chambers 11, and the individual collection channels 12*b* in this order will be small. For this reason, the dimension of the minute communication portion 20 is preferably small, and the channel resistance of the minute communication portion 20 is preferably large.

Figure 7:
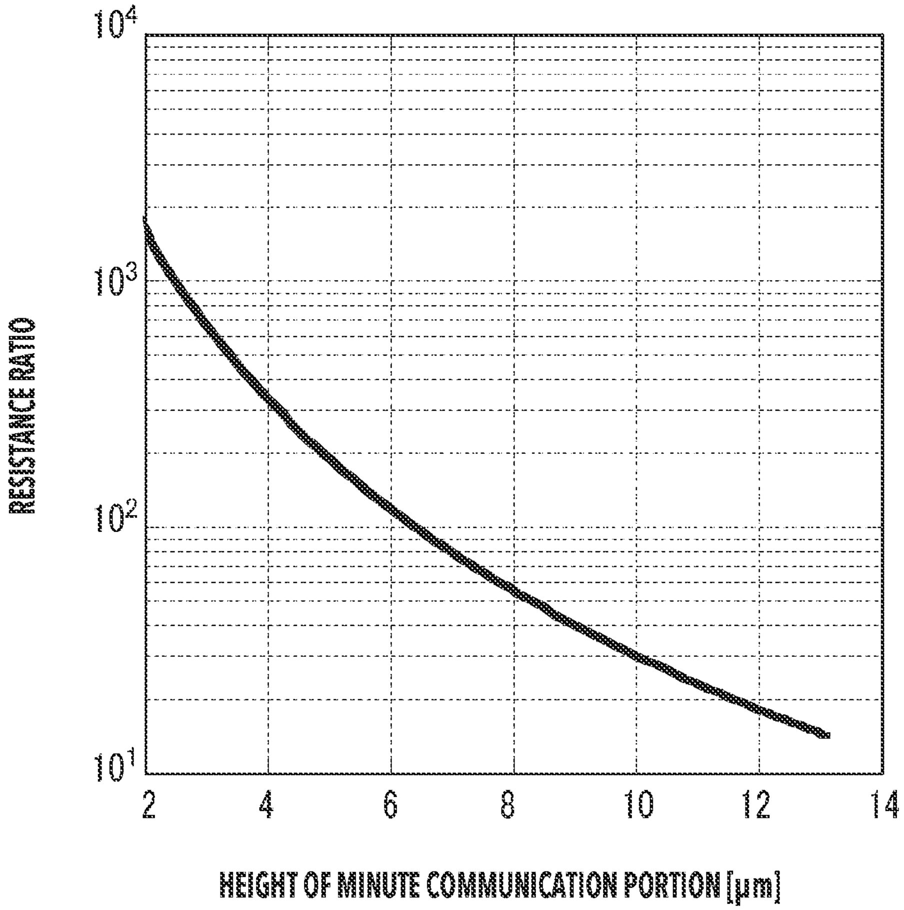
FIG. 7 is a graph illustrating a relation between the height of a minute communication portion and a viscous resistance ratio.

FIG. 7 is a graph in which the horizontal axis represents the height of the minute communication portion 20, and the vertical axis represents the ratio between the viscous resistance of the minute communication portion 20 and the viscous resistance of ejection channels (channels from the individual supply channels 12*a* through the pressure chambers 11 to the individual collection channels 12*b*). The viscous resistance of the channel at the minute communication portion 20 is 100 times the viscous resistance of the ejection channels or more and desirably 1000 times or more. The height of the minute communication portion 20 is 7 μm or less and desirably 3 μm or less.

As described above, the configuration is such that the bonding layer 19 is not provided between the liquid supply substrate 203 and the channel partitions 16 between the common supply channels 13*a* and the common collection channels 13*b*, and the minute communication portion 20 is provided there. This makes it possible to provide a liquid ejection head and liquid ejection apparatus capable of reducing or preventing a decrease in image quality without increasing the chip size.

Second Embodiment

A second embodiment of the present invention will be described below with reference to drawings. Note that the basic configuration in the present embodiment is similar to that in the first embodiment, and the characteristic configuration will therefore be described below.

Figure 8A:
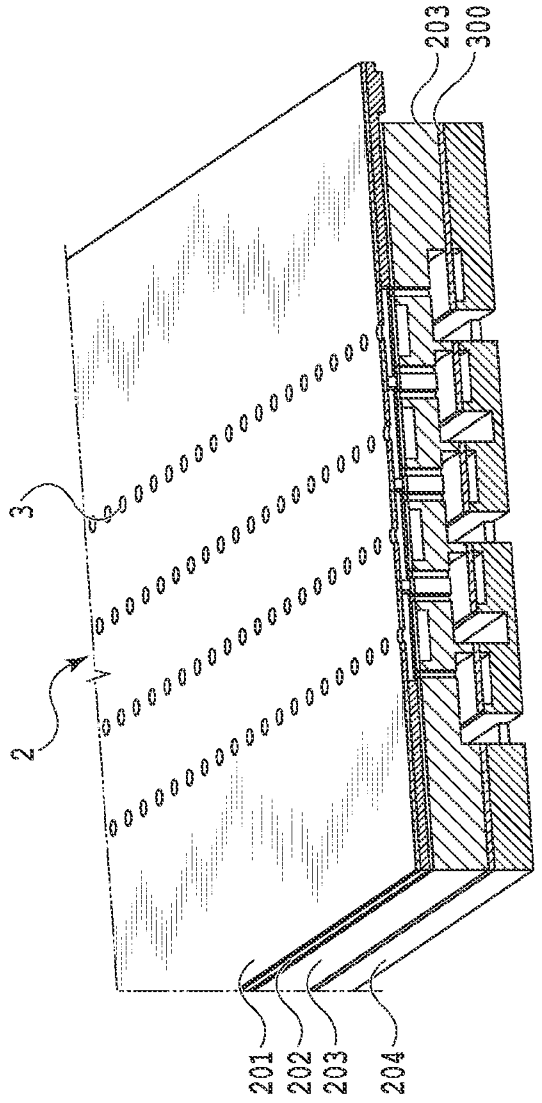
FIG. 8A is a view illustrating a liquid ejection substrate.
Figure 8B:
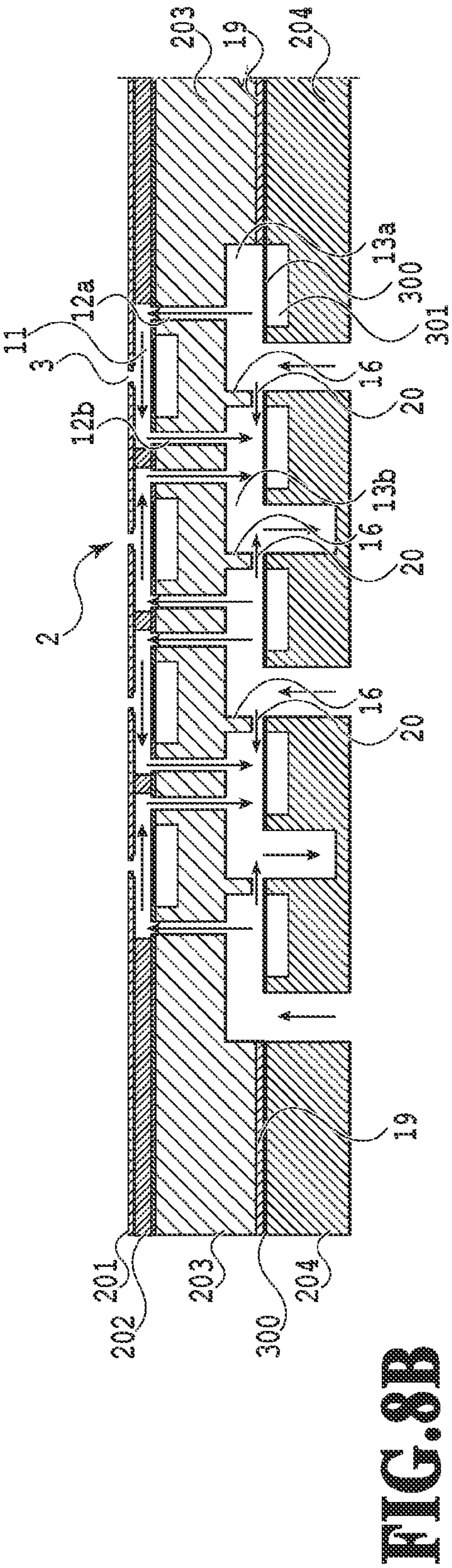
FIG. 8B is a view illustrating the liquid ejection substrate.

FIG. 8A is a partial cross-sectional view of a liquid ejection substrate 2 in the present embodiment. 8B is a cross-sectional view of the liquid ejection substrate 2. In the liquid ejection substrate 2 in the present embodiment, the individual supply channels 12*a*, the individual collection channels 12*b*, the common supply channels 13*a*, and the common collection channels 13*b* are disposed in the liquid supply substrate 203. Such a configuration eliminates the need for the damper substrate 302 in the first embodiment and reduces the number of substrates, thereby allowing a cost reduction.

In the present embodiment, the damper member 300 is provided between the liquid supply substrate 203 and the channel formation substrate 204, and the bonding layer 19 is provided between the damper member 300 and the liquid supply substrate 203. Moreover, the channel partitions 16 are provided on the liquid supply substrate 203, the bonding layer 19 is not provided between the channel partition 16 and the damper member 300, and the minute communication portion 20 is provided there.

By, employing a configuration in which the bonding layer 19 is not provided on the channel partitions 16 between the common supply channels 13*a* and the common collection channels 13*b* as described above, sufficient areas are provided for the common supply channels 13*a* and the common collection channels 13*b*, thereby reducing the pressure loss. Moreover, providing the minute communication portion 20 allows generation of circulatory flows on the damper areas 301 and reduces stagnation. This facilitates the flow of bubbles and so on in the common supply channels 13*a* and the common collection channels 13*b* by the circulatory flows.

Third Embodiment

A third embodiment of the present invention will be described below with reference to drawings. Note that the basic configuration in the present embodiment is similar to that in the first embodiment, and the characteristic configuration will therefore be described below.

Figure 9A:
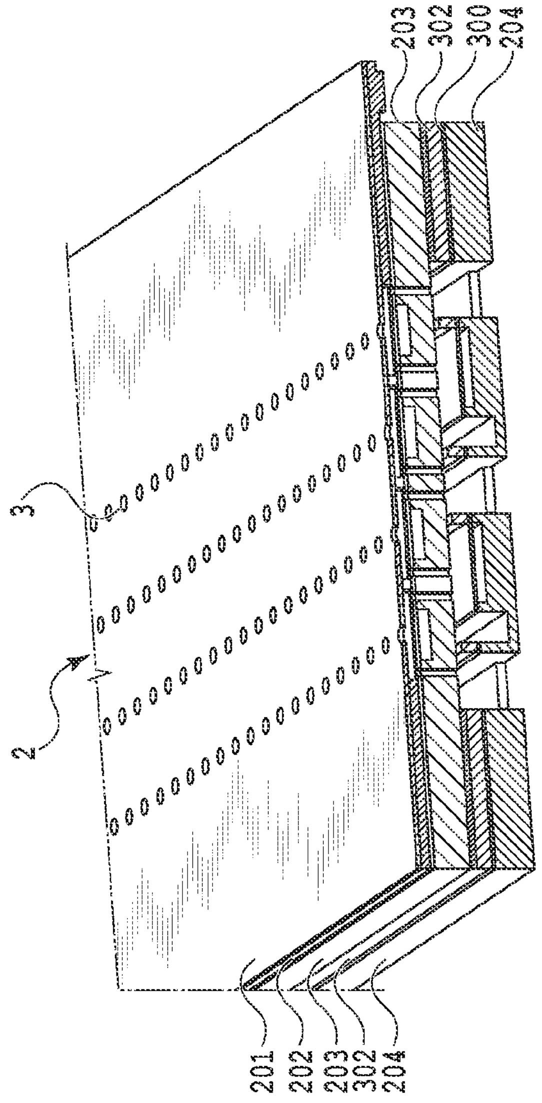
FIG. 9A is a view illustrating a liquid ejection substrate.
Figure 9B:
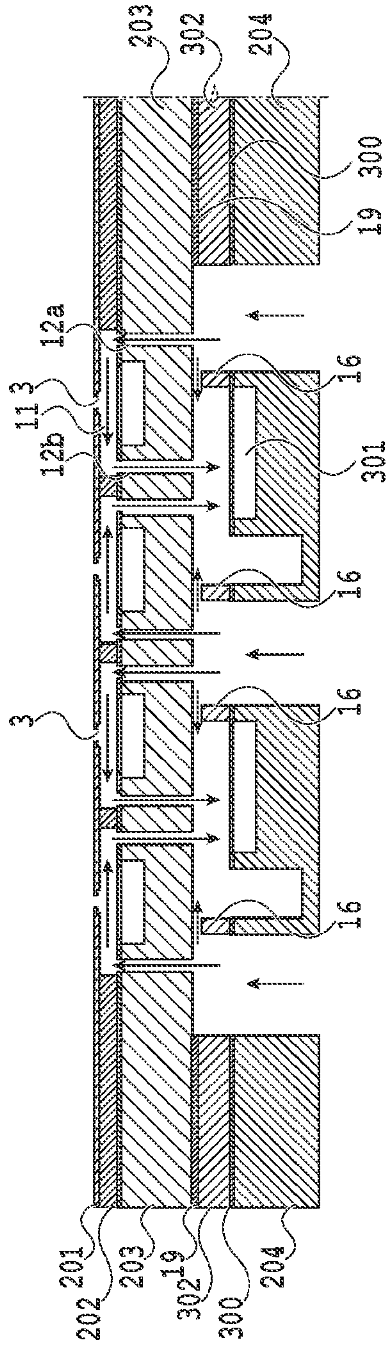
FIG. 9B is a view illustrating the liquid ejection substrate.

FIG. 9A is a partial cross-sectional view of a liquid ejection substrate 2 in the present embodiment. FIG. 9B is a cross-sectional view of the liquid ejection substrate 2. In the liquid ejection substrate 2 in the present embodiment, the damper areas 301 are disposed at positions opposed to the individual collection channels 12*b* and are not provided at positions opposed to the individual supply channels 12*a*. In a configuration in which the liquid is circulated through the pressure chambers 11, the pressure in the individual collection channels 12*b* is set lower than the pressure in the individual supply channels 12*a*, in order to generate circulatory flows. Accordingly, pressure fluctuations occurring in the pressure chambers 11 in response to ejection propagate to the individual collection channels 12*b* to a greater extent. Thus, an advantageous effect can be achieved by providing the damper areas 301 at the positions opposed to the individual collection channels 12*b* and not providing the damper areas 301 at the positions opposed to the individual supply channels 12*a*.

Furthermore, the absence of the damper areas 301 at the positions opposed to the individual supply channels 12*a* makes it possible to enlarge the damper areas 301 at the positions opposed to the individual collection channels 12*b*.

Generally, the damping performance is dependent on the thickness, surface area, and Young's modulus of the damper member 300. The smaller the thickness and Young's modulus of the damper member 300 are, the greater the crosstalk suppression effect will be. In this case, however, the mechanical strength of the damper member 300 is a concern. Hence, increasing the surface area of the damper member 300 is effective from the viewpoint of the reliability in mechanical strength.

Figure 10A:
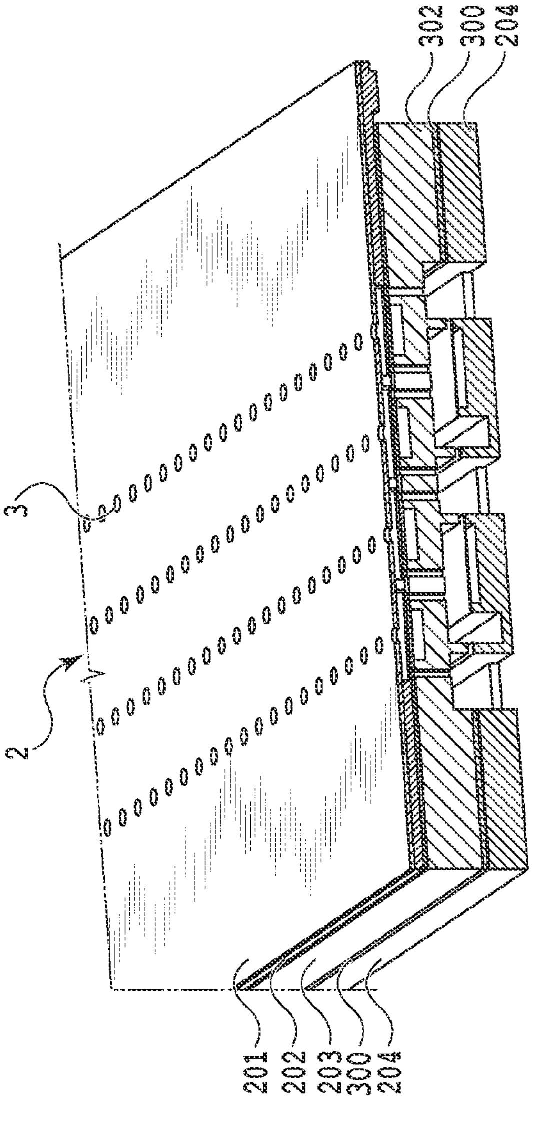
FIG. 10A is a view illustrating a modification of the liquid ejection substrate.
Figure 10B:
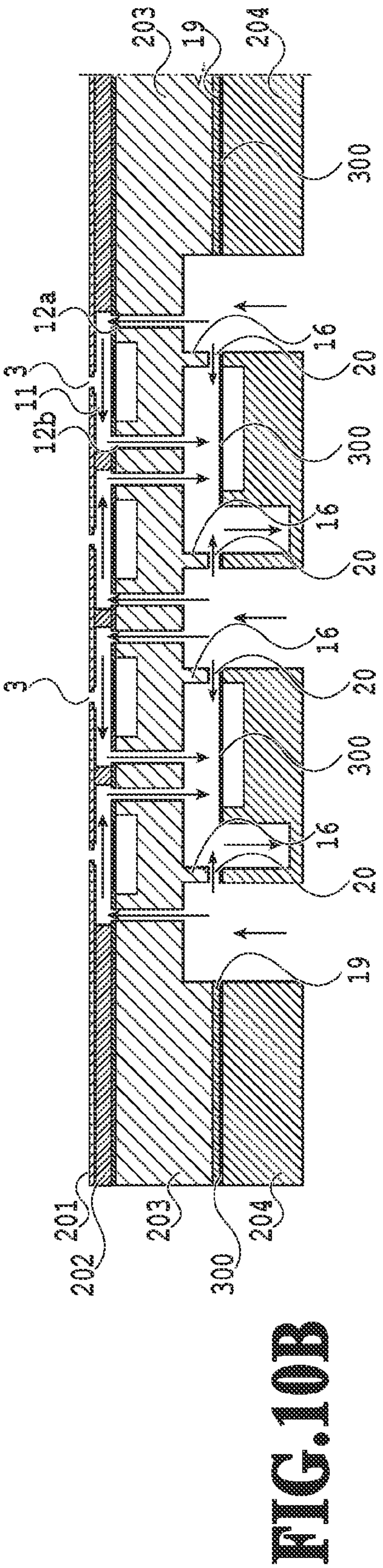
FIG. 10B is a view illustrating the modification of the liquid ejection substrate.

FIG. 10A is a partial cross-sectional view illustrating a modification of the liquid ejection substrate 2 in the present embodiment. FIG. 10B is a cross-sectional view of the liquid ejection substrate 2. As illustrated in FIGS. 10A and 10B, the configuration in the present embodiment may be applied to a configuration in which the liquid supply substrate 203 and the damper substrate 302 are formed integrally with each other as in the second embodiment.

In the present embodiment, an example has been described in which the damper areas 301 are disposed at the positions opposed to the individual collection channels 12*b* and not provided at the positions opposed to the individual supply channels 12*a*. However, the present embodiment is not limited to this example. Specifically, the configuration may be such that the damper areas 301 are provided at either the positions opposed to the individual collection channels 12*b* or the positions opposed to the individual supply channels 12*a*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056385, filed Mar. 30, 2022, which is hereby incorporated by reference herein in its entirety.

What is claimed is:

1. A liquid ejection head comprising:

a plurality of ejection ports from which to eject a liquid;

a plurality of pressure chambers communicating with the ejection ports;

a plurality of pressure generating elements provided in the pressure chambers and being capable of ejecting the liquid from the corresponding ejection port by applying pressure;

individual supply channels communicating with the pressure chambers and being capable of supplying the liquid to the pressure chambers;

individual collection channels communicating with the pressure chambers and being capable of collecting the liquid from the pressure chambers;

a common supply channel communicating with the individual supply channels;

a common collection channel communicating with the individual collection channels;

a channel partition provided between the common supply channel and the common collection channel;

a first substrate where the channel partition is formed;

a second substrate laminated on the first substrate;

a communication portion communicating with the common supply channel and the common collection channel; and a bonding layer provided between the first substrate and the second substrate, wherein the communication portion communicating with the common supply channel and the common collection channel is provided at an area which is present between the first substrate where the channel partition is formed and the second substrate laminated on the first substrate, and corresponds to the channel partition, the bonding layer includes a bonding area provided with an adhesive material and a non-bonding area provided with no adhesive material, and the channel partition is provided at a position corresponding to the non-bonding area of the bonding layer.

2. The liquid ejection head according to claim 1, wherein circulatory flows flow through the common supply channel, the individual supply channels, the pressure chambers, the individual collection channels, and the common collection channel in the listed order.

3. The liquid ejection head according to claim 1, wherein viscous resistance of the communication portion is at least 100 times the viscous resistance of channels from the individual supply channels through the pressure chambers to the individual collection channels.

4. The liquid ejection head according to claim 1, wherein viscous resistance of the communication portion is at least 1000 times the viscous resistance of channels from the individual supply channels through the pressure chambers to the individual collection channels.

5. The liquid ejection head according to claim 1, wherein a height of the communication portion is 7 μm or less.

6. The liquid ejection head according to claim 1, wherein a height of the communication portion is 3 μm or less.

7. The liquid ejection head according to claim 1, wherein each of the pressure generating elements comprises a piezoelectric element.

8. The liquid ejection head according to claim 1, further comprising a damper member at least at one of the common supply channel or the common collection channel, the damper member being capable of absorbing pressure fluctuations occurring in the pressure chambers.

9. The liquid ejection head according to claim 1, further comprising a damper member at the common collection channel, the damper member being capable of absorbing pressure fluctuations occurring in the pressure chambers.

10. The liquid ejection head according to claim 8, wherein the plurality of ejection ports are provided so as to form an array, and the damper member is provided so as to extend along the array of the ejection ports.

11. The liquid ejection head according to claim 1, wherein the individual supply channels, the individual collection channels, the common supply channel, and the common collection channel are formed in the first substrate.

12. A liquid ejection apparatus comprising:

a liquid ejection head; and a member that mounts the liquid ejection head, wherein the liquid ejection head comprises:

a plurality of ejection ports from which to eject a liquid;

a plurality of pressure chambers communicating with the ejection ports;

a plurality of pressure generating elements provided in the pressure chambers and being capable of ejecting the liquid from the corresponding ejection port by applying pressure;

individual supply channels communicating with the pressure chambers and being capable of supplying the liquid to the pressure chambers;

individual collection channels communicating with the pressure chambers and being capable of collecting the liquid from the pressure chambers;

a common supply channel communicating with the individual supply channels;

a common collection channel communicating with the individual collection channels;

a channel partition provided between the common supply channel and the common collection channel;

a first substrate where the channel partition is formed;

a second substrate laminated on the first substrate;

a communication portion communicating with the common supply channel and the common collection channel; and a bonding layer provided between the first substrate and the second substrate, wherein the communication portion communicating with the common supply channel and the common collection channel is provided at an area which is present between the first substrate where the channel partition is formed and the second substrate laminated on the first substrate, and corresponds to the channel partition, the bonding layer includes a bonding area provided with an adhesive material and a non-bonding area provided with no adhesive material, and the channel partition is provided at a position corresponding to the non-bonding area of the bonding layer.

* * * * *